W. C. SMITH.
CORNSTALK CUTTER.
APPLICATION FILED JUNE 6, 1912.
1,038,979.
Patented Sept. 17, 1912.
2 SHEETS—SHEET 1.
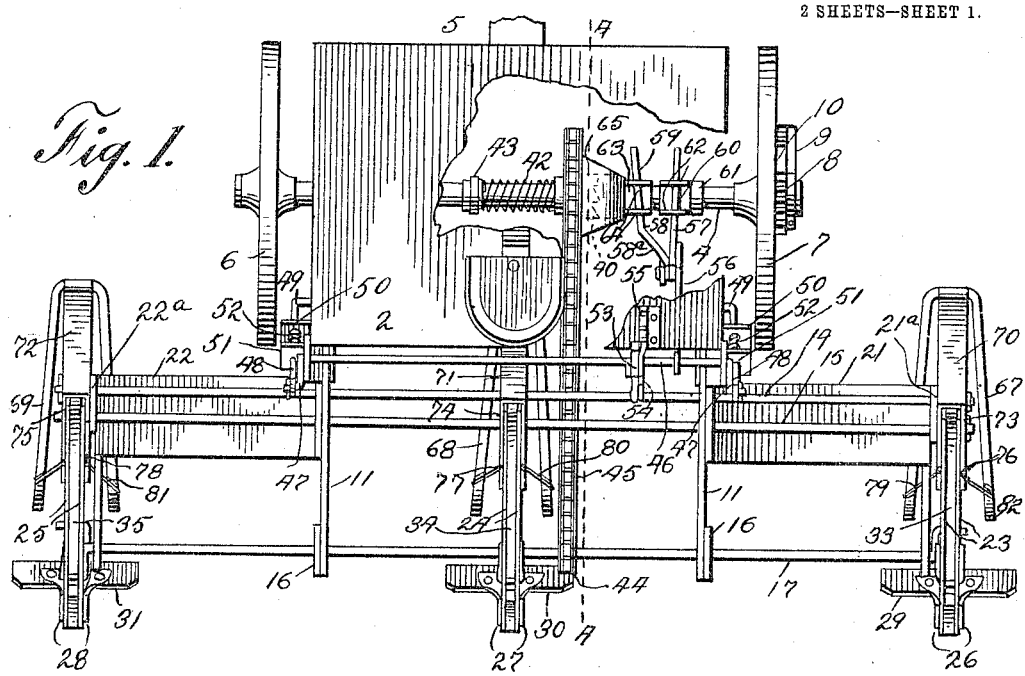
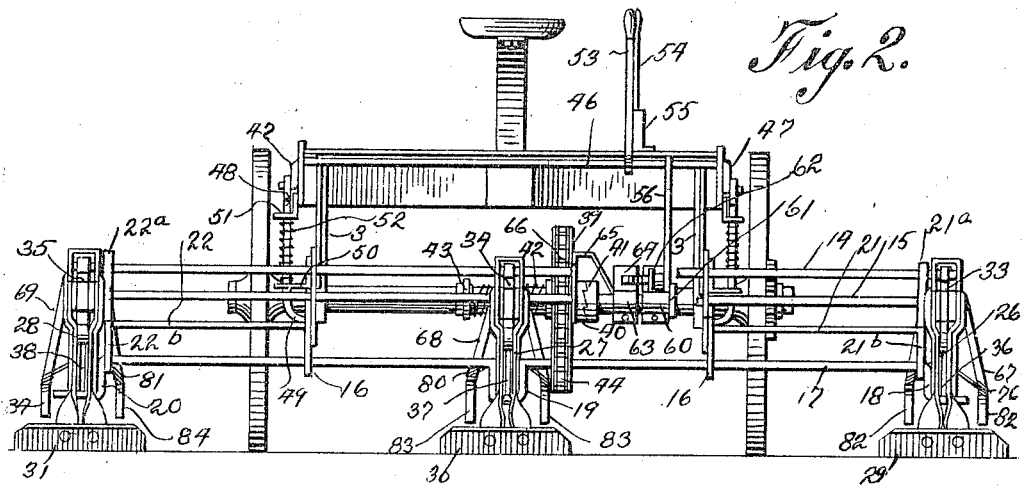
Witnesses
Inventor
W. C. Smith.
By Chas. A. Briscoe
Attorney

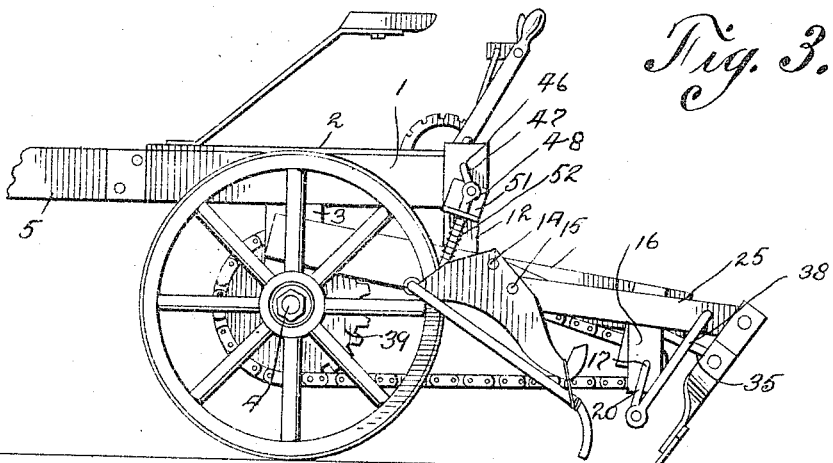
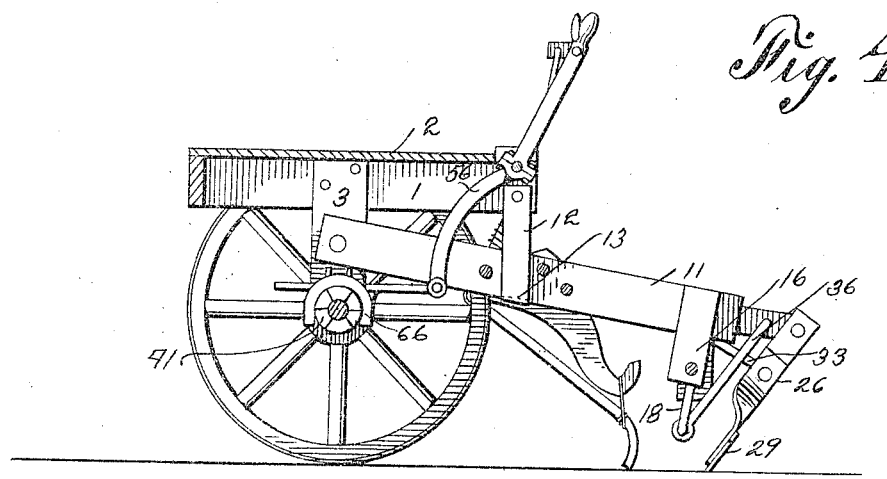

UNITED STATES PATENT OFFICE.

WILLIAM C. SMITH, OF KEARNEY, MISSOURI.

CORNSTALK-CUTTER.

1,038,979. Specification of Letters Patent. Patented Sept. 17, 1912.

Application filed June 6, 1912. Serial No. 702,066.

*To all whom it may concern:*

Be it known that I, WILLIAM C. SMITH, a citizen of the United States, residing at Kearney, in the county of Clay and State of Missouri, have invented certain new and useful Improvements in Cornstalk-Cutters, of which the following is a specification.

My invention relates to machines for cutting corn stalks and other plants for harvest, and has for its object the provision of a machine provided with one or more chopping members mounted for reciprocation and operated by the traction wheels of the machine to cut up the stalks.

Another object of my invention is the provision of means by which the chopping members are given a motion resembling the movement of a hand operated tool.

Another object of my invention is the provision of means for raising and lowering the chopping members manually and at the same time throwing the gearing for operating the chopping members out of and into gear respectively.

My invention will be described in detail hereinafter and illustrated in the accompanying drawings, in which, Figure 1 is a top plan view of my improved corn stalk cutter showing the platform partly broken away to disclose the operating mechanism thereunder; Fig. 2, a rear view showing the cutting members in their operative position; Fig. 3, a side view; and Fig. 4, a sectional view on the line 4—4 of Fig. 1.

In the drawings similar reference characters will be used to designate corresponding parts throughout the several views.

My improved corn stalk cutter comprises a frame 1 having mounted thereon a platform 2 and downwardly extending bearing members 3 in which is journaled the shaft 4.

5 indicates the draft pole secured to the front end of the frame 1 and on which is adapted to be secured any suitable draft appliances (not shown).

Rigidly secured at one end of the shaft 4 is a traction wheel 6 and loosely mounted on the other end of the shaft is a traction wheel 7, 8 indicating a ratchet secured to the wheel 7 and 9 an arm secured to the shaft and having a spring actuated pawl 10 mounted thereon that engages said ratchet when the machine is moved forwardly to rotate the shaft 4 in conjunction with the wheel 6.

11 indicates arms pivotally secured to the bearing members 3 and extending rearwardly of the frame and 12 bars secured to the sides of the frame 1 and having outwardly extending flanges 13 that engage the arms 11 to limit their downward movement.

14 and 15 indicate laterally extending rods that engage arms 11 that operate as supporting members for the chopping devices to be hereinafter described.

Secured near the rear terminals of the arms 11 are downwardly extending bearing members 16 in which are journaled the shafts 17 having the cranks 18, 19 and 20 formed thereon.

21 and 22 indicate plates secured to the arms 11 and having their outer ends bent upwardly to form ears $21^a$ and $22^a$ respectively which are mounted on the bars 14 and 15, and also downwardly extending bearing members $21^b$ and $22^b$ respectively to support the terminals of the shafts 17 adjacent to the cranks 18 and 20.

The chopping members consist of the spaced apart arms indicated at 23, 24 and 25 respectively that are pivotally mounted at one of their terminals on the rod 15 and have pivoted to their outer terminals the arms 26, 27 and 28 on which are mounted the blades 29, 30 and 31.

33, 34 and 35 indicate rods pivotally secured to the arms 26, 27 and 28 respectively, and to the rod 14.

36, 37 and 38 indicate links connecting the cranks 18, 19 and 20 respectively, with the arms 23, 24 and 25 respectively.

It will be understood from this construction that when the shaft 17 is rotated, the arms 23, 24 and 25 are given an oscillating movement through the cranks 18, 19 and 20 and the links 36, 37 and 38 that operate to raise and lower the chopping blades 29, 30 and 31. At the same time, the rods 33, 34 and 35 by their connection with the rod 14 and the supporting arms 26, 27 and 28, cause the blades 29, 30 and 31 to move forwardly and rearwardly as the upward and downward oscillation of the blades is accomplished by the rotation of the shaft 17. By this construction and operation, it will be apparent that said blades are given a movement similar to that given the blade of a hand operated tool, and when coming in contact with the stalks of reclining corn, serve to cut them up.

39 indicates a sprocket wheel revolubly mounted on the shaft 4 and having a clutch member 40 therein that is normally held in engagement with the clutch member 41 secured to the shaft 4, by means of a coiled spring 42 mounted on said shaft and engaging said sprocket wheel 39 and a collar 43 on the shaft. 44 indicates a sprocket wheel secured to the shaft 17, and 45 a chain geared to said sprocket wheels 39 and 44. By this construction, it will be apparent that when the clutch member 40 is in engagement with the clutch member 41, that the forward movement of the machine on the traction wheels 6 and 7 operates through the shaft 4 and the chain and sprocket gears 39, 44 and 45 to rotate the shaft 17 to cause the oscillation of the blades 29, 30 and 31 heretofore described.

46 indicates a shaft journaled adjacent to the rear margin of the platform 2 and having its terminals formed with crank arms 47, on which are mounted the hook members 48 having their free terminals formed with hooks 49 that engage the rearwardly extending arms 11.

50 indicate guide brackets secured to the arms 11 in which the hook members 48 reciprocate, and 51 other guide brackets secured to the frame 1 and also acting as bearings for the hook members 48.

52 indicate springs mounted on the hook members 48 and having their terminals engaging the brackets 50 and 51 to normally depress the brackets 50 and with them the pivoted arms 11.

53 indicates a lever secured to shaft 46 and having a finger latch 54 mounted thereon and 55 a segmental rack or quadrant mounted on the platform 2 and adapted to engage the lower terminal of the finger latch 54.

56 indicates an arm secured to the shaft 46 and extending under the platform 2 and having rods 57 and 58 pivotally secured to its free terminal, the arm 58 being bent outwardly as shown at 58ª adjacent to its secured portion and its extended end 59 inclined away from the rod 57.

60 indicates a sleeve revolubly mounted on the shaft 4 and engaging a shoulder 61 secured to said shaft, said sleeve having upwardly extending ears 62 in which is slidably mounted the rod 57. 63 indicates another sleeve slidably and revolubly mounted on the shaft 4 and having upwardly extending ears 64 in which are slidably mounted the end 59 of the rod 58.

65 indicates a plate secured to the sleeve 63 that extends over the clutch member 41 and has downwardly extending arms 66 that engage the side of the sprocket wheel 39.

It will be understood from this construction that the arms 11 may be raised by throwing the lever 53 forwardly, and by means of the shaft 46 secured thereto and the cranks 47 on the end thereof on which are mounted the hook rods 48 having their lower ends 49 engaging said arms 11, the arms 11 will be raised so that the cutting blades 29, 30 and 31 will be lifted into an inoperative position. At the same time that the arms 11 are raised, the rotation of the shaft 46 will move the arm 56 secured thereto, rearwardly, sliding the rods 57 and 58 in the ears 62 and 64 respectively, of the sleeves 60 and 63, and the sleeve 63 will be moved by the outwardly inclined end 59 of the rod 58 toward the clutch member 41 and the plate 65 secured thereto by means of its arm 66 engaging the sprocket wheel 39, will move said sprocket wheel against the resistance of the spring 42 to throw the clutch member 40 secured thereto out of engagement with said clutch member 41 and the machine will proceed without operating the cutter blades heretofore described.

It will be understood that as the machine passes over the rows of corn stalks that they will be bent down by the shaft 4 and held in a reclining position to be operated upon by the chopping blades heretofore described, and to provide for straightening the stalks along the rows so that they will be in position for being operated upon by the chopping blades 29, 30 and 31, I provide U-shaped rods 67, 68 and 69, having their bent portions pivotally mounted on arms 70, 71 and 72 extending from the casings 73, 74 and 75. Said casings 73, 74 and 75 are mounted on the bars 14 and 15 and inclose the arms 23, 24 and 25 and the rods 33, 34 and 35. The rear ends of the casings 73, 74 and 75 are provided with hooks 76, 77 and 78 on which are mounted chains 79, 80 and 81 that are secured to the two arms of U-shaped rods 67, 68 and 69 to support said rods and at the same time allow for vertical oscillation thereof, while in operation. The rearmost terminals of the two arms and the rods 67, 68 and 69 are provided with downwardly extending ends 82, 83 and 84 that engage on the two sides of the stalk to straighten it preparatory to being operated upon by the cutting blades aforesaid.

I have shown and described my improved machine as adapted for operating on three rows of plants at one time, but it will be apparent that by very slight alterations, the machine may be adapted for operating on a larger or smaller number of rows at one time, and I do not therefore limit myself to the specific construction shown and described.

Having thus described my invention, what I claim is:—

1. In a machine of the class described, a frame, a shaft journaled on said frame, traction wheels secured to said shaft, arms pivotally mounted on said frame and adapted for vertical oscillation, rods secured to said arms, a shaft journaled on said arms, chopping blades mounted for oscillation on the rods aforesaid, gearing connecting the shaft journaled on the frame and the shaft journaled on said arms, means to raise and lower said arms, and means operated by said raising and lowering means to throw the gearing aforesaid into and out of gear with the first mentioned shaft.

2. In a machine of the class described, a frame, a shaft journaled on said frame, traction wheels secured to said shaft, arms pivotally mounted on said frame and adapted to move in vertical planes, rods secured to said arms, a shaft journaled on said arms, said shaft having crank members formed thereon, rearwardly extending arms pivotally mounted on one of the rods aforesaid, downwardly extending arms pivotally secured to the free terminals of the last mentioned arms, chopping blades secured to the lower terminals of said downwardly extending arms, a rod pivotally secured to each of said downwardly extending arms and pivotally engaging the other of said rods, links connecting the crank members on the shaft aforesaid with said rearwardly extending arms, a sprocket wheel revolubly mounted on the first mentioned shaft, a clutch member secured to said sprocket wheel, a clutch member secured to the shaft and adapted to engage the clutch member on the sprocket wheel, means to hold said clutch members in engagement, said sprocket wheel being geared to the shaft journaled on said vertically moving arms, means to raise and lower said vertically moving arms, and means operated by said raising and lowering means to move said clutch members into and out of engagement.

3. In a machine of the class described, a frame, a shaft journaled on said frame, arms pivotally secured to said frame and adapted for movement through vertical planes, chopping members operatively mounted on said arms, gearing mounted on said shaft and operatively connected with said chopping members, a clutch member secured to the gearing member mounted on the shaft, a clutch member secured to said shaft, a spring mounted on the shaft and engaging said gearing member to hold the clutch members in engagement, a sleeve slidably mounted on the shaft and having upwardly extending ears, a plate secured to said sleeve and engaging the gearing member, a laterally inclined rod slidably engaging said ears, a rock shaft journaled on said frame and operatively secured to said vertically moving arms, means to rock said shaft, and an arm secured to said shaft and pivotally engaging said laterally inclined rod.

In testimony whereof I affix my signature in presence of two witnesses.

WILLIAM C. SMITH.

Witnesses:
 A. E. KING,
 J. R. WOODS.

Copies of this patent may be obtained for five cents each, by addressing the "Commissioner of Patents, Washington, D. C."